(12) United States Patent
Rolfe

(10) Patent No.: US 6,256,149 B1
(45) Date of Patent: *Jul. 3, 2001

(54) LENTICULAR LENS SHEET AND METHOD OF MAKING

(76) Inventor: Richard W. Rolfe, 95 Graham St., Biddeford, ME (US) 04005

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,073

(22) Filed: Sep. 28, 1998

(51) Int. Cl.⁷ .............................. G02B 27/10; G02F 5/00; B29D 11/00
(52) U.S. Cl. .......................... 359/619; 359/620; 264/215
(58) Field of Search .................................. 359/619, 620, 359/621, 900; 264/2.5

(56) References Cited

U.S. PATENT DOCUMENTS

| | | | |
|---|---|---|---|
| D. 250,651 | 12/1978 | Rosenthal | D16/4 |
| 3,146,492 | 9/1964 | Lemelson | 18/10 |
| 3,357,772 | 12/1967 | Rowland | 350/167 |
| 3,538,198 | 11/1970 | de Montebello | 264/1 |
| 3,584,369 | 6/1971 | de Montebello | 29/458 |
| 3,594,457 | 7/1971 | Wright | 264/1 |
| 3,706,486 | 12/1972 | de Montebello | 350/167 |
| 4,034,555 | 7/1977 | Rosenthal | 58/127 |
| 4,129,628 | 12/1978 | Tamutus | 264/1 |
| 4,414,316 | 11/1983 | Conley | 430/496 |
| 4,420,221 | 12/1983 | Sparks | 428/172 |
| 4,541,727 | 9/1985 | Rosenthal | 368/232 |
| 4,767,186 | 8/1988 | Bradley et al. | 350/128 |
| 5,298,366 | * 3/1994 | Iwasaki et al. | 430/321 |
| 5,315,491 | * 5/1994 | Spencer et al. | 362/84 |
| 5,330,799 | 7/1994 | Sandor et al. | 427/510 |
| 5,500,157 | * 3/1996 | Graebner et al. | 264/1.21 |
| 5,544,741 | 8/1996 | Fantone et al. | 206/308.1 |
| 5,554,432 | * 9/1996 | Sandor et al. | 428/157 |
| 5,588,526 | 12/1996 | Fantone et al. | 206/308.1 |
| 5,623,368 | 4/1997 | Calderini et al. | 359/619 |
| 5,642,226 | 6/1997 | Rosenthal | 359/619 |
| 5,647,151 | 7/1997 | Fantone et al. | 40/454 |
| 5,714,218 | * 2/1998 | Nishio et al. | 428/64.1 |
| 6,084,713 | * 7/2000 | Rosenthal | 359/619 |
| 6,091,482 | * 7/2000 | Carter et al. | 355/79 |

* cited by examiner

Primary Examiner—Ricky Mack
(74) Attorney, Agent, or Firm—Pierce Atwood; Patrick R. Scanlon

(57) ABSTRACT

A method is provided for producing lenticular lens sheets having improved optical characteristics. The method includes the steps of providing a platen having a series of grooves formed therein so as to define a series of parallel ridges, positioning a sheet of formable material next to the platen, heating the sheet to render it formable, and applying a pressure differential to the sheet that forces the sheet into contact with the ridges on the platen. This process produces a lenticular lens sheet having a plurality of parallel lenticules. Each lenticule has a catenary surface having a non-uniform radius of curvature that is greatest at the center of the lenticule and smallest at its outer edges.

12 Claims, 5 Drawing Sheets

LENTICULAR LENS SHEET AND METHOD OF MAKING

BACKGROUND OF THE INVENTION

This invention relates generally to lenticular lenses and more particularly to thermoformed lenticular lens sheets.

The use of lenticular lenses in multiple image display devices is a well-established practice. Such display devices typically include a printed sheet or image panel having a composite image defined by interlaced image bands from two or more distinct images. A transparent sheet having a plurality of elongate, parallel lens elements, or lenticules, is placed over the printed sheet. The image bands are situated with respect to the lenticules such that the display device exhibits different images when viewed from different lines of sight. Multiple image display devices have been used in relatively small devices such as cards, buttons, pins and other novelties for many years. Attempts have been made to utilize lenticular display devices in larger displays such as billboards and the like. However, producing an array of lenticules large enough for such applications has proven to be a difficult and expensive endeavor.

Manufacture of lenticular lens sheets is currently accomplished through a variety of established methods including injection molding, compression molding, embossing, machining, extruding and casting. In addition to being unable to inexpensively form large lenticular lens sheets, these conventional methods are typically slow and expensive and often require large, complex machinery. Furthermore, they are not easily adapted to making lenticular lens sheets of different sizes and shapes.

Many lenticular lens sheets used in conventional display devices are designed to have lenticules with a distinct focal point or narrow focusing, typically with a focal length that is equal to the thickness of the lens sheet. That is, they strive to focus incident light rays from a given line of sight onto a single point. In this sense, the term "focus" refers to the phenomenon of a convex lens causing incident light rays to converge onto a focal point and does not refer to the sharpness or clarity of an image. Also, because of the elongate nature of these lenticules, incident light rays are focused into a line instead of a point, but the term "focal point" will be used herein to follow the common convention. Narrow focusing is desirable because it permits many images to be incorporated into the composite image, thereby providing a display device with a strong animation effect. However, narrow focusing also results in high magnification of the images with a corresponding washed out appearance. Narrow focusing also means that illumination light will be focused into narrow strips on the image bands. Consequently, the device will suffer from low illumination and not all of the image band will be visible (i.e., a loss of information). Furthermore, a narrowly focused lens sheet will need to be precisely positioned in relation to the composite image, which requires a rigorous manufacturing process, because of the distinct focal length of the lenses. The effective viewing distance for a display device having a narrowly focused lens sheet will also be limited to a small range.

Accordingly, there is a need for a process of manufacturing lenticular lens sheets that is simple and inexpensive and capable of forming lenticular sheets of virtually any size or shape. There is also a need for a lenticular lens sheet that, when used in a multiple image display device, provides brighter, clearer images that do not have a washed out appearance, that presents more information than conventional lens sheets, and that has a wide focusing tolerance.

SUMMARY OF THE INVENTION

The above-mentioned needs are met by the present invention which provides a method of producing lenticular lens sheets including the steps of providing a platen having a series of grooves formed therein so as to define a series of parallel ridges, positioning a sheet of formable material next to the platen, heating the sheet to render it formable, and applying a pressure differential to the sheet that forces the sheet into contact with the ridges on the platen. This process produces a lenticular lens sheet having a plurality of parallel lenticules. Each lenticule has a catenary surface having a non-uniform radius of curvature that is greatest at the center of the lenticule and smallest at its outer edges. This unique surface provides improved optical performance over conventional lenticular lenses.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
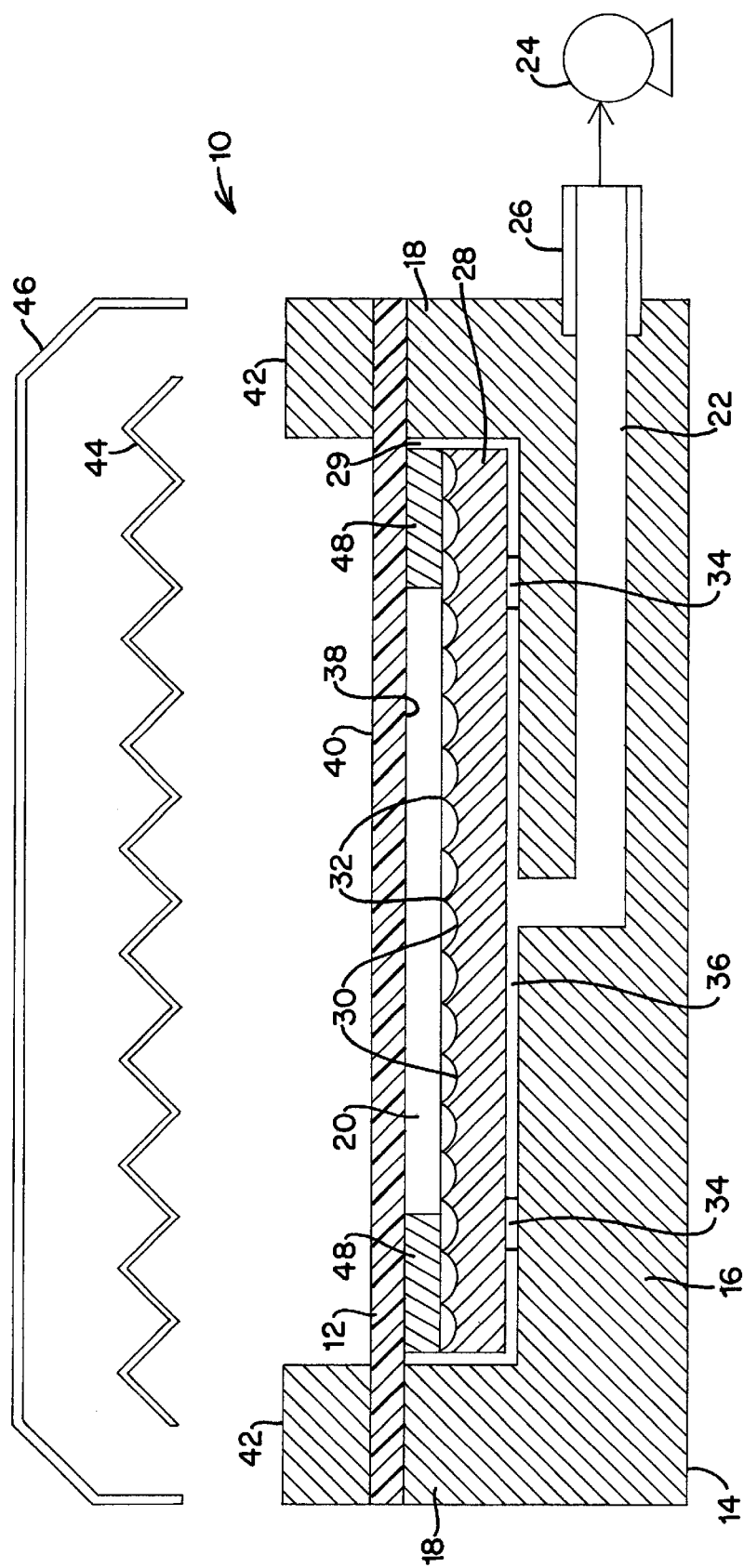
FIG. 1 is a sectional view of a vacuum forming system illustrating the process of the present invention for forming a lenticular lens sheet.
Figure 2:
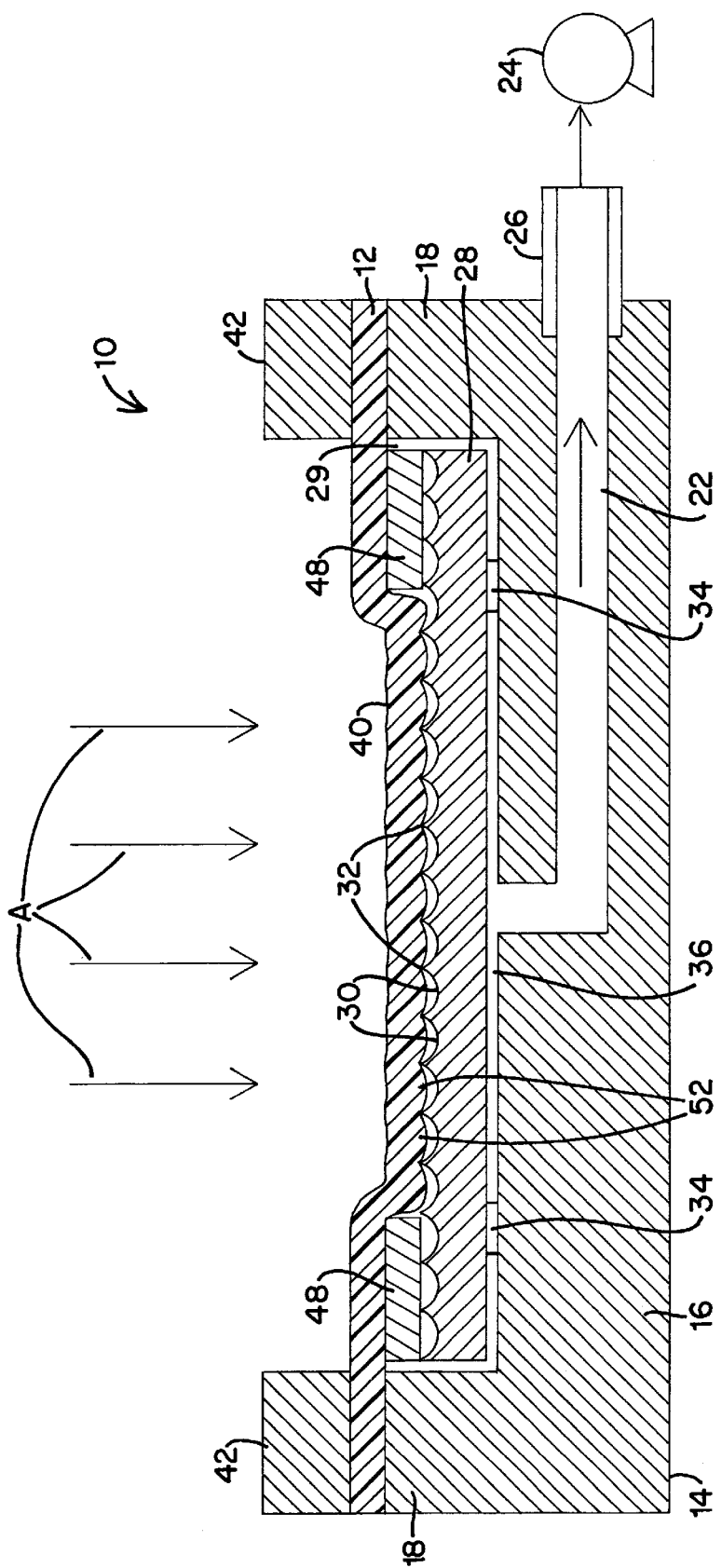
FIG. 2 is another sectional view of the vacuum forming system that further illustrating the process of the present invention for forming a lenticular lens sheet.
Figure 3:
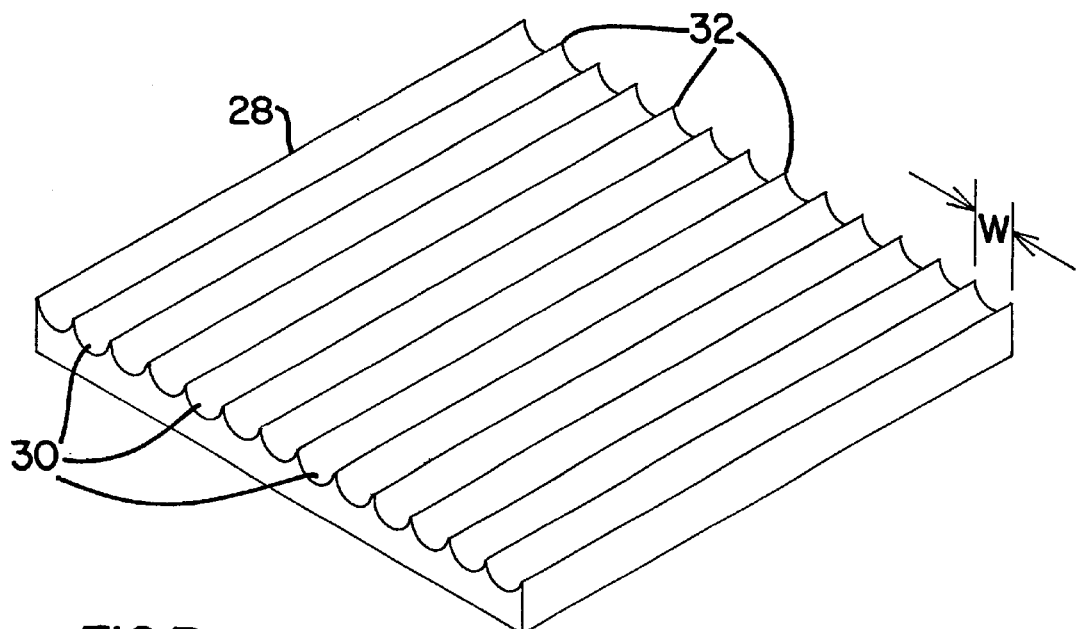
FIG. 3 is a perspective view of a platen useful in the process of the present invention.

Referring to the drawings wherein identical reference numerals denote the same elements throughout the various views, FIGS. 1 and 2 show a vacuum forming system 10 for forming a sheet 12 into a lenticular lens sheet suitable for use in a multiple image display device. It should be noted that vacuum forming system 10 is merely one exemplary system for performing the process of the present invention; the inventive process is not limited to this particular system, but, as will be clear from the following description, can be performed by a variety of systems.

Vacuum forming system 10 includes a frame 14 for supporting sheet 12. Frame 14 has a base 16 and a rim 18 formed about the perimeter of base 16 so as to define a central recess 20. A conduit 22 is formed in frame base 16 providing fluid communication between recess 20 and the system exterior. A pump 24 is connected to the conduit outlet 26 so that a partial vacuum can be applied to recess 20.

A platen 28 for molding sheet 12 is placed in recess 20. Platen 28 is sized so as to provide a gap 29 between its edges and frame rim 18. A series of grooves 30 (best seen in FIG.

3) is formed across one side of platen 28 to define a series of parallel ridges 32. The distance between adjacent ridges 32 defines the groove width, w. Grooves 30 are shown with a relatively wide groove width for clarity of illustration. In practice, the groove width, which determines the resultant width of the individual lenses, or lenticules, formed on sheet 12, will be determined by the intended application of the lenticular lens sheet, but will typically be in the range of about 0.020 inches for smaller lens sheets and about 0.320 inches for larger (e.g., 4 feet by 8 feet) lens sheets. As shown in the drawings, grooves 30 have a curved, U-shaped profile, but a V-shaped profile could be used as well. Such profiles are desirable because of their relative ease of machining. Nevertheless, it is within the scope of the present invention to provide grooves having any profile as long as the grooves define parallel ridges and are of sufficient depth, as will be described in more detail below.

Platen 28 is a substantially rectangular body, although other shapes are possible, and can be made of any suitable material capable of withstanding the temperatures and pressures to which it will be exposed. Preferably, platen 28 is made of a material, such as aluminum or brass, having high thermal conductivity and is made as thin as possible. In this way, platen 28 will cool quickly, thereby increasing the cycle time of system 10. The relatively low cost of the platen material and the ease with which such a platen can be manufactured means that very large platens can be economically produced. At least one spacer 34 is disposed between base 16 and platen 28 so as to create a gap 36 therebetween. Gaps 29 and 36 maintain the fluid communication established by conduit 22.

Sheet 12 is placed over recess 20 with one side, the proximal face 38, facing platen 28 and the other side, the distal face 40, facing away from platen 28. Sheet 12 can be any kind of clear, formable material, preferably thermoplastics such as polyvinyl chloride, polyethylene teraphthalate, acrylic, or polycarbonate. A clamp 42 maintains sheet 12 in position on frame 14. As shown in FIG. 1, a heating element 44 is positioned above frame 14 in sufficient proximity to sheet 12 so as to be capable of heating sheet 12 to its forming temperature. As used herein, the term "forming temperature" refers to the temperature at which a material is sufficiently softened so that it can be molded into a different shape, but is still below its melting point. For the materials contemplated, the forming temperature will typically be in the range of about 250–350° F. A hood or enclosure 46 is positioned over heating element 44 so as to minimize heat loss.

Figure 4:
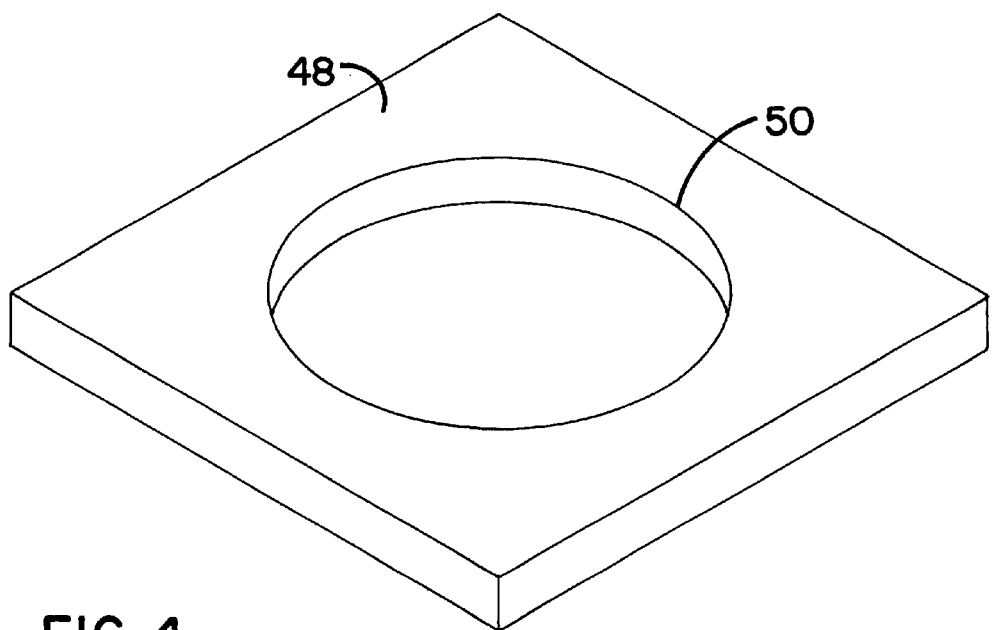
FIG. 4 is a perspective view of a template useful in the process of the present invention.

A template 48 can be disposed between sheet 12 and platen 28 to provide a three-dimensional shape to sheet 12. As shown in FIG. 4, template 48 is a flat rectangular sheet having outer dimensions substantially the same as platen 28. An aperture 50 is formed through template 48. Aperture 50, which is shown as a circle for illustration purposes only, can be any type of closed shape, including ovals, diamonds and heart shapes. By simply substituting templates, lenticular lens sheets of various shapes and sizes can be made without changing platen 28. (In contrast, processes such as injection molding would require fabrication of an entire new mold for every shape and size.) It should be noted that templates having multiple apertures are also within the scope of the present invention. Template 48 can be made of any inexpensive, easy to form material that is sufficiently durable, such as aluminum, manufactured hardboard, or wood. The combined thickness of template 48 and platen 28 is preferably equal to the depth of recess 20.

To form a lenticular lens sheet, system 10 is prepared by placing platen 28 in recess 20 and template 48 on platen 28. Sheet 12 is clamped into place on frame 14 and heated to its forming temperature by heating element 44 as shown in FIG. 1. Alternatively, sheet 12 could be first heated in an oven or by other external heating means and then clamped to frame 14. Once sheet 12 is brought to its forming temperature, a pressure differential is created between proximal face 38 and distal face 40 so that a positive pressure (represented by arrows A in FIG. 2) is exerted on distal face 40. In accordance with the embodiment illustrated in FIGS. 1 and 2, the pressure differential is applied by operating pump 24 to create a partial vacuum in central recess 20. It is also within the scope of the present invention to create the pressure differential by applying a pressurized fluid to distal face 40.

Referring now to FIG. 2, the pressure differential will force the portion of sheet 12 overlying template aperture 50 toward platen 28 until proximal face 38 contacts ridges 32, which produce an impression on the soft surface. Sheet 12 is left in contact with platen 28 until it has cooled and re-hardened. Sheet 12 can be cooled passively (i.e., simply allowed to cool due to the cooler ambient temperature) or actively. Active cooling can be accomplished by any known method, including misting with a fine spray of water or impingement with cool air. After cooling, sheet 12 will have a plurality of elongate, parallel lens elements or lenticules 52, defined by ridges 32, formed on proximal face 38.

The overall size of a lenticular lens sheet produced by the process of the present invention is essentially limited only by the size of platen 28. Because very large platens can be economically fabricated, as mentioned above, the process of the present invention provides an outstanding method for producing large lenticular lens sheets.

Figure 5:
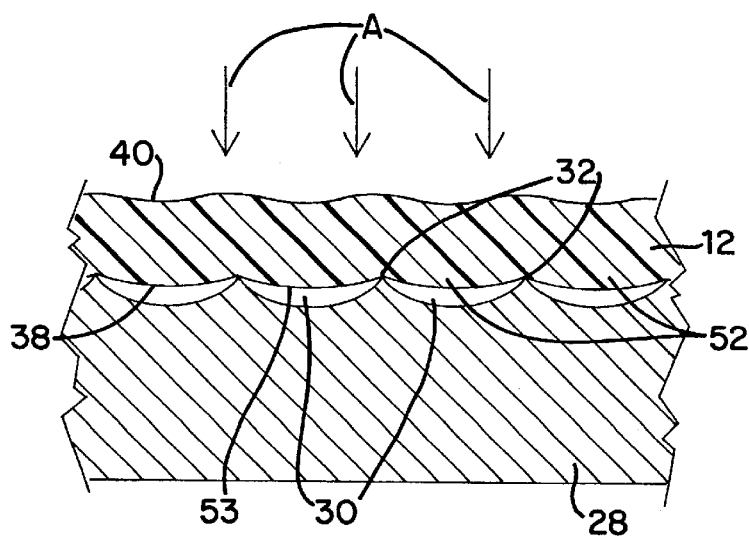
FIG. 5 is a partial, enlarged sectional view of a sheet being formed on a platen.

As best seen in FIG. 5, it can be seen that the differential pressure exerted on distal face 40 does not cause sheet 12 to completely fill grooves 30 so that the final lenticule shape does not replicate the profile of grooves 30. Instead, platen 28 forms an impression in proximal face 38 defining convex curves extending between ridges 32. The resulting lenticules 52 are thus provided with a unique catenary surface 53 that provides improved lens performance as described in more detail below. Furthermore, the process of the present invention produces a lenticular lens sheet having high optical quality because most of the lens surface does not touch platen 28, thereby greatly reducing the chance for surface flaws to be created. Because sheet 12 does not completely fill and replicate grooves 30, the actual groove profile is not important (which enhances the ease of platen fabrication), but grooves 30 must be sufficiently deep to allow the catenary surface 53 to form. The extent to which sheet 12 fills grooves 30 is a function of the thickness, t, of sheet 12, the groove width, w, and the magnitude of the pressure differential. These parameters are purposely selected to cause sheet 12 to incompletely fill grooves 30 and produce the catenary lens surface 53. Ideally, for normal pressure differentials used in vacuum forming, the sheet thickness t should be between about one half to one times the groove width w. Typically the sheet thickness will range from about 0.015 inches for smaller lens sheets to about 0.250 for larger lens sheets.

The differential pressure will also slightly reshape distal face 40. Specifically, distal face 40 will also have a catenary surface, although this catenary surface will have an amplitude that is substantially less than that of catenary surface 53. In fact, the amplitude of the distal face surface will be negligible so that distal face 40 is essentially planar.

Figure 6:
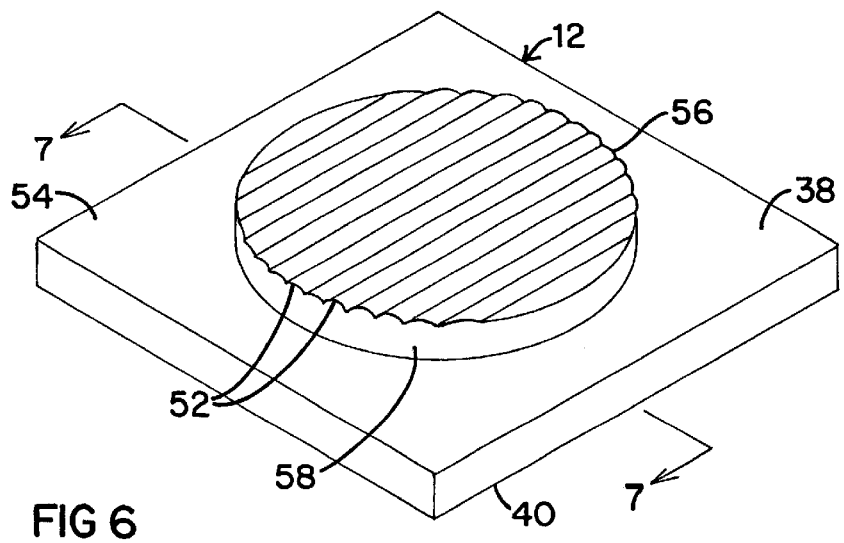
FIG. 6 is a perspective view of a lenticular lens sheet of the present invention.
Figure 7:
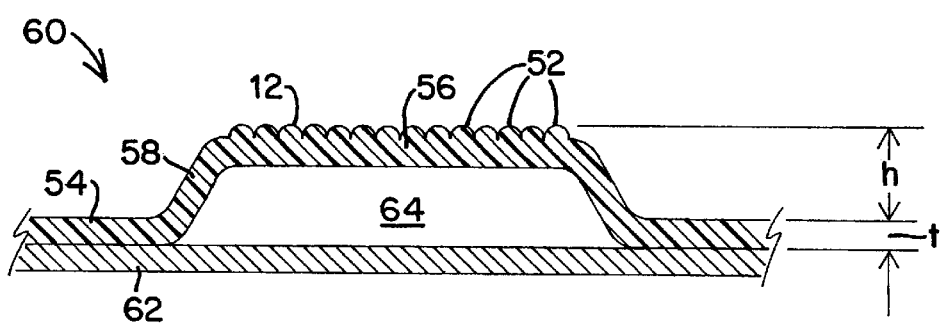
FIG. 7 is a sectional view of the lenticular lens sheet illustrated in FIG. 6 and taken generally along line 7—7.

A completed lenticular lens sheet 12 is shown in FIGS. 6 and 7. As a result of template 48, lenticular lens sheet 12 has a smooth portion 54 and a lens portion 56 having lenticules 52 formed thereon. Lens portion 56, which has the same shape as template aperture 50, is set above smooth portion 54 (when viewed from proximal face 38) by a standoff 58. The thickness of template 48 will determine the height, h, of standoff 58. A multiple image display device 60 can be made by affixing the distal face of smooth portion 54 to an image panel 62 bearing a composite image, as shown in FIG. 7. With this arrangement, the area of image panel 62 underlying lens portion 56 would bear a composite image and the area underlying smooth portion 54 would bear a conventional image. Standoff 58 creates an air gap 64 between lens portion 56 and image panel 62. By selecting the template thickness to produce the desired standoff height h, lens portion 56 can be properly spaced from image panel 62 for the focusing of lenticules 52. However, as described below, one of the advantages provided by the catenary lens surface 53 of the present invention is that precise relative positioning of lens portion 56 and image panel 62 is not necessary. The raised nature of lens portion 56 also makes lenticular lens sheet 12 of the present invention very suitable for use in blister packaging. And since the sheet thickness does not have to equal the focal length, lenticular lens sheet 12 can be considerably thinner than conventional lens sheets.

Alternately, a lenticular lens sheet can be formed without using template 48; in which case, lens portion 56 would assume the same shape defined by frame 14. If a flat lenticular lens sheet is desired, then standoff 58 can be trimmed off, thereby removing smooth portion 54.

Figure 8:
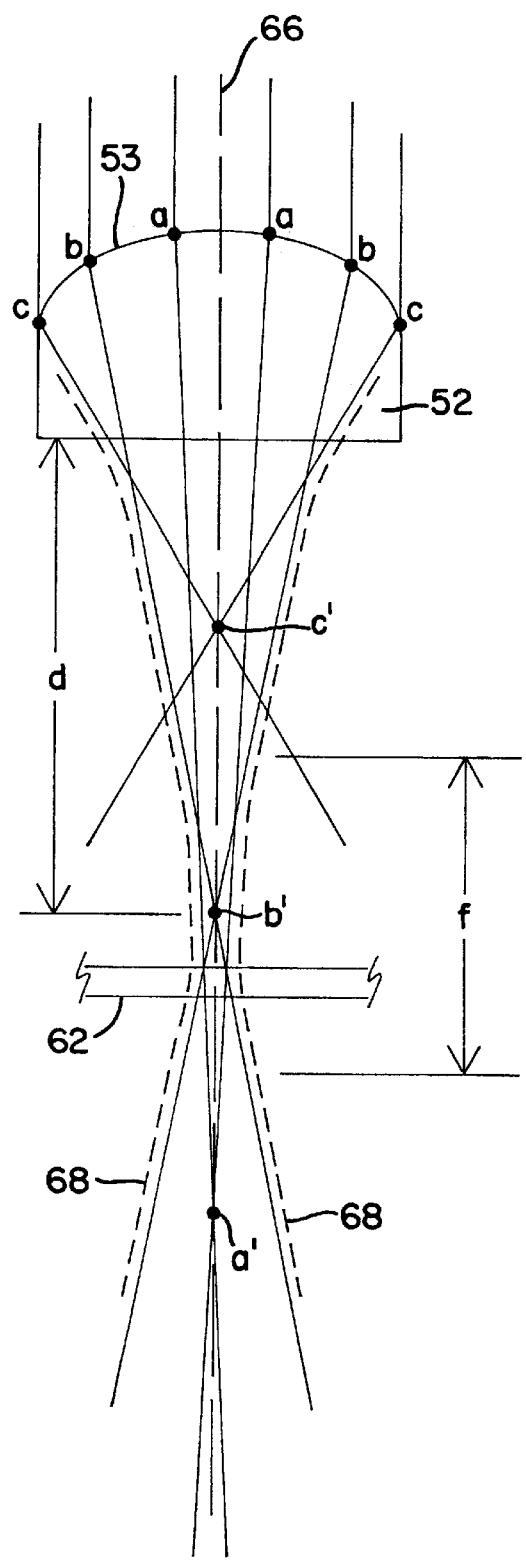
FIG. 8 is an end view of a single lenticule from a lenticular lens sheet of the present invention.
Figure 9:
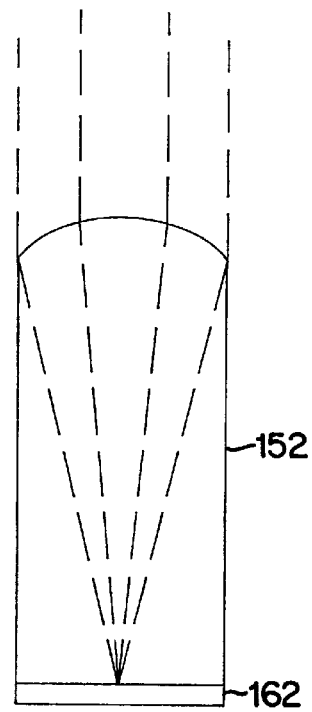
FIG. 9 is an end view of a single lenticule from a prior art lenticular lens sheet.

The advantages of the catenary lens shape are illustrated with reference to FIGS. 8 and 9. FIG. 8 shows a lenticule 52 from lenticular lens sheet 12 of the present invention, and FIG. 9 shows a lenticule 152 from a conventional lenticular lens sheet. As seen in FIG. 8, catenary lens surface 53 has a finite, but non-uniform radius of curvature that decreases from the lenticule centerline 66 to the edges of lenticule 52. In other words, the radius of curvature is greatest at centerline 66, is smaller at point a on catenary surface 53, is smaller still at point b on catenary surface 53, and is smallest at point c on the outer edge of catenary surface 53. With this unique surface, lenticule 52 focuses incident light to different points. For example, parallel light rays striking lenticule 52 at points a equidistant from centerline 66 converge onto a focal point a', and parallel light rays striking lenticule 52 at points b equidistant from centerline 66 converge onto a focal point b' that is considerably closer to lenticule 52 than point a', and parallel light rays striking lenticule 52 at points c equidistant from centerline 66 converge onto a focal point c' that is even closer to lenticule 52. As such, lenticule 52 does not have a single focal point for any given line of sight, but instead has many. Accordingly, lenticule 52 defines a wedge of focused light (depicted by dashed lines 68 in FIG. 8) having a variable focus width that converges to a smallest width a distance, d, from lenticule 52 and then diverges again. Good imaging can be obtained in a multiple image display device as long as its image panel is located at a point where the focus width is narrow enough to resolve multiple images (which is dependent on the width of the interlaced image bands in the composite image). As seen in FIG. 8, the broad focusing of lenticule 52 results in a wide focusing tolerance, f, in which image panel 62 can effectively be located with respect to lenticule 52. This is why a display device using a lenticular lens sheet of the present invention does not require precise positioning of the lens sheet and image panel.

In contrast, the conventional lenticule 152 of FIG. 9 focuses parallel light beams onto a single focal point in order to enhance resolution; i.e., to increase the number of separate images that can be merged into the composite image. This requires precise placement of an image panel 162 right on this focal length, which can be a rigorous manufacturing process. Moreover, as mentioned above, such narrow focusing results in a washed out appearance, low illumination and a loss of information. The broad focusing provided by the catenary shape of the present invention overcomes these problems. Even at its narrowest point, light is focused onto image panel 62 with a relatively wide focus width. This results in more illumination, brighter images with more intense colors, and the presentation of more information.

The foregoing has described a method for easily and inexpensively forming lenticular lens sheets, particularly large lenticular lens sheets, and a lenticular lens sheet having improved optical characteristics. While specific embodiments of the present invention have been described, it will be apparent to those skilled in the art that various modifications thereto can be made without departing from the spirit and scope of the invention as defined in the appended claims.

What is claimed is:

1. A method of producing a lenticular lens sheet, said method comprising the steps of:
   providing a platen having a series of grooves formed therein so as to define a series of parallel ridges, wherein said grooves have a width;
   positioning a sheet of formable material adjacent to said platen, wherein said sheet has a thickness that is at least one half times said width of said grooves;
   heating said sheet to its forming temperature; and
   applying a pressure differential to said sheet so as to force said sheet into contact with said ridges.

2. The method of claim 1 further comprising the step of cooling said sheet while it is in contact with said ridges.

3. The method of claim 1 further comprising the step of placing a template between said sheet and said platen.

4. The method of claim 3 wherein said template has a shaped aperture formed therein.

5. The method of claim 1 wherein said sheet is made of a thermoplastic material.

6. The method of claim 1 wherein said step of applying a pressure differential is performed by creating a partial vacuum between said sheet and said platen.

7. The method of claim 1 wherein said step of applying a pressure differential is performed in a manner to prevent said sheet from completely filling said grooves.

8. The method of claim 1 wherein said step of heating said sheet is performed prior to said step of positioning said sheet adjacent to said platen.

9. A lenticular lens sheet comprising:
   a smooth portion having an upper surface;
   a raised portion having a lower surface, said lower surface of said raised portion being set above said upper surface of said smooth portion; and
   a plurality of elongate, parallel lenticules formed on said raised portion, each one of said plurality of lenticules having a non-uniform radius of curvature that is greatest at its center and smallest at its outer edges.

10. The lenticular lens sheet of claim 9 wherein said sheet is made of a thermoplastic material.

11. A multiple image display device comprising:
    an image panel bearing a composite image; and
    a lenticular lens sheet placed over said image panel, said lenticular lens sheet including a smooth portion affixed to said image panel and a raised portion set above said smooth portion so as to define a gap between said raised portion and said image panel and having a plurality of elongate, parallel lenticules formed on said raised portion, each one of said plurality of lenticules defining a curved surface having a finite, non-uniform radius of curvature that is greatest at its center and smallest at its outer edges.

12. The multiple image display device of claim 11 wherein said lenticular lens sheet is made of a thermoplastic material.

* * * * *